United States Patent [19]

Small et al.

[11] 4,365,289

[45] Dec. 21, 1982

[54] METHOD AND CONTROL SYSTEM FOR CONTROLLING APPARATUS

[75] Inventors: James E. Small, Indianapolis; Mark E. David, New Palestine, both of Ind.

[73] Assignee: Emhart Industries, Inc., Indianapolis, Ind.

[21] Appl. No.: 118,470

[22] Filed: Feb. 4, 1980

[51] Int. Cl.³ .................... G06F 15/46; G05B 19/10
[52] U.S. Cl. .................... 364/143; 219/492; 307/141.4; 340/309.1; 364/144
[58] Field of Search ............ 364/104, 107, 120, 400, 364/140–147, 188, 189; 307/141, 141.4, 141.8, 41, 293, 38, 115; 340/309.1, 309.4; 134/570, 580; 68/12 R; 219/494, 497, 498, 501, 506, 489, 492; 328/34, 130

[56] References Cited

U.S. PATENT DOCUMENTS

| | | | |
|---|---|---|---|
| 3,603,961 | 9/1971 | Duris et al. | 340/309.4 |
| 3,774,056 | 11/1973 | Sample et al. | 364/104 X |
| 3,819,906 | 6/1974 | Gould, Jr. | 219/506 |
| 3,969,703 | 7/1976 | Kwiatkowski et al. | 364/104 X |
| 4,001,599 | 1/1977 | Karklys | 307/141 |
| 4,035,795 | 7/1977 | Fosnough et al. | 307/141.4 X |
| 4,068,179 | 1/1978 | Sample et al. | 340/309.4 X |
| 4,071,773 | 1/1978 | Scott | 307/141 |
| 4,084,237 | 4/1978 | Beachem et al. | 364/400 |
| 4,104,542 | 8/1978 | Karklys et al. | 307/141 |
| 4,134,027 | 1/1979 | Scott et al. | 307/141 |
| 4,137,463 | 1/1979 | Scott et al. | 307/141 |
| 4,158,432 | 6/1979 | van Bavel | 340/309.4 X |
| 4,234,801 | 11/1980 | Small | 307/38 |
| 4,245,296 | 1/1981 | Small et al. | 364/104 |

*Primary Examiner*—Joseph F. Ruggiero
*Attorney, Agent, or Firm*—Robert F. Meyer; David W. Gomes

[57] ABSTRACT

A method and control system for controlling an apparatus having at least one machine function and a cycle of operation associated therewith provides a central control element for controlling the function, an input for selecting one of a plurality of fixed periods for causing the control element to activate the function for a cycle of operation in response to the selected period, a device for determining a variable period independent of the fixed periods, and an input for the variably determined period into the control element, the control element having information stored therein, which information includes the fixed periods and an instruction repertoire for causing the control element to control the machine function in response to either one of the fixed periods or the variably determined period.

21 Claims, 5 Drawing Figures

METHOD AND CONTROL SYSTEM FOR CONTROLLING APPARATUS

BACKGROUND OF THE INVENTION

1. Field Of The Invention

This invention generally relates to control systems for apparatuses and, in particular, to methods and control systems for controlling an apparatus having at least one machine function to be controlled in response to one or more operating parameters.

2. Statement Of The Prior Art

Control systems have long been widely used for a variety of apparatuses of which are included industrial, commercial and domestic machines and appliances. These machines and appliances each have at least one machine function and many have more. These functions are usually controlled in response to one or more operating parameters such as duration, position, temperature, and a wide variety of other generic and individual conditions. Many control systems have been developed for operating these machine functions in response to the various operating parameters and conditions. Included in these attempts are a number of circuits which employ digital electronics. In complex systems, where conditions permit, the control function is even handled by an appropriately programmed general purpose computer. In general, smaller, less complicated apparatuses have been restricted in the area of automated control to hard wired analog and digital control systems because the cost of the apparatuses will not usually justify the substantial cost of a general purpose computer. The disadvantages of such hard wired systems are that they are more costly to design and build, as they must be individually tailored for each application, and relatedly that they are more difficult systems in which to allow for variations in the various control functions. General purpose computers, on the other hand, are more easily adaptable to different variations as only the programs therefor need be changed. With the advent of large scale integration and, more specifically, the development of microcomputer chips, wherein entire small scale general purpose computers may be built into a single integrated circuit, it has been possible to produce the essence of individual general pupose computers on a large scale and thus low cost basis. As these integrated circuits are in fact general purpose computers, variations in different controlling parameters may be easily compensated for by means of the program contained therein.

SUMMARY OF THE INVENTION

Generally speaking, the present invention provides a control system for an apparatus having at least one machine function and a cycle of operation associated therewith, comprising a central control element for controlling the machine function, means for inputting a selection of one of a plurality of fixed periods to the central control element for causing it to activate the machine function for a cycle of operation in response to the selected period, means for determining a variable period for the cycle of operation independently of the plurality of fixed periods, and second means for inputting the variable period from the means for determining and into the central control element, the central control element having information stored therein, which information includes the plurality of fixed periods for selection through the first means for inputting and an instruction repertoire for causing the control element to control the machine function in response to either one of the fixed periods or a variably determined period.

The method of the present invention is for controlling an apparatus by a control system including a control element having information stored therein, which information includes an instruction repertoire for causing the control element to operate the apparatus either in response to one of a plurality of fixed periods also stored as information or an independently variably determined period. The method comprises: determining whether one of the plurality of fixed periods or the variably determined period has been selected for the operation of the apparatus; recording the period selected either from the stored information if one of the plurality of fixed periods or from a means for variably determining a period; and operating the apparatus for the recorded period.

Alternatively, a method for controlling an apparatus having at least one machine function and a cycle of operation associated therewith, comprises: energizing a control circuit including a control element having information stored therein, which information includes an instruction repertoire for causing the control element to control the machine function; and selecting a period determining input for either one of a plurality of fixed periods, the fixed periods also being stored as information in the control element, or a variable period as determined independently from the plurality of fixed periods, wherein the instruction repertoire is caused to control the cycle of operation in response to the selected period determining input.

BRIEF DESCRIPTION OF THE DRAWINGS

The present invention is described in reference to the appended drawings, in which:

FIG. 2, comprising

DETAILED DESCRIPTION OF THE DRAWINGS

Figure 1A:
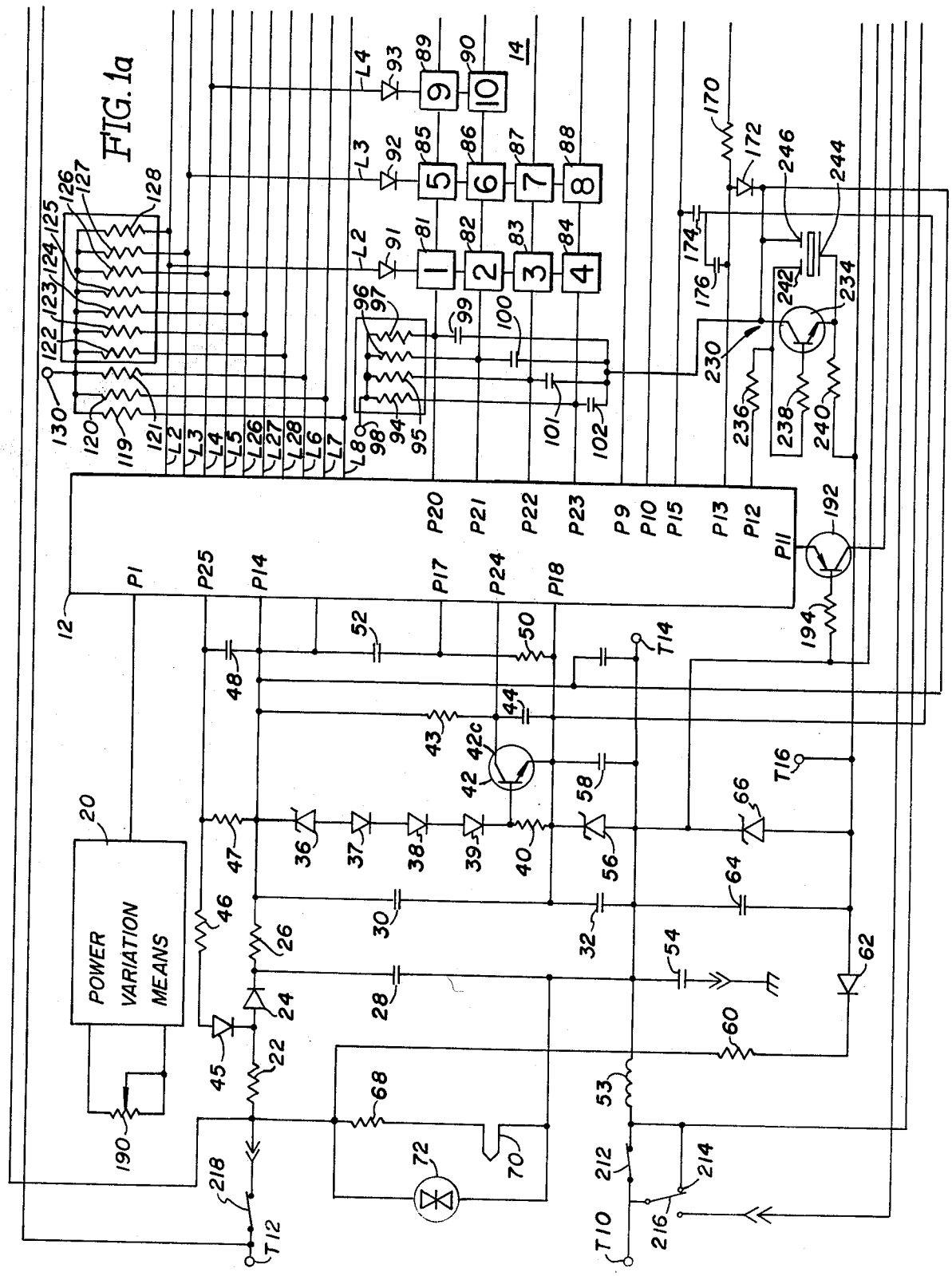
FIGS. 1A and 1B combine to show a schematic diagram of a control system according to one embodiment of the present invention.
Figure 1B:
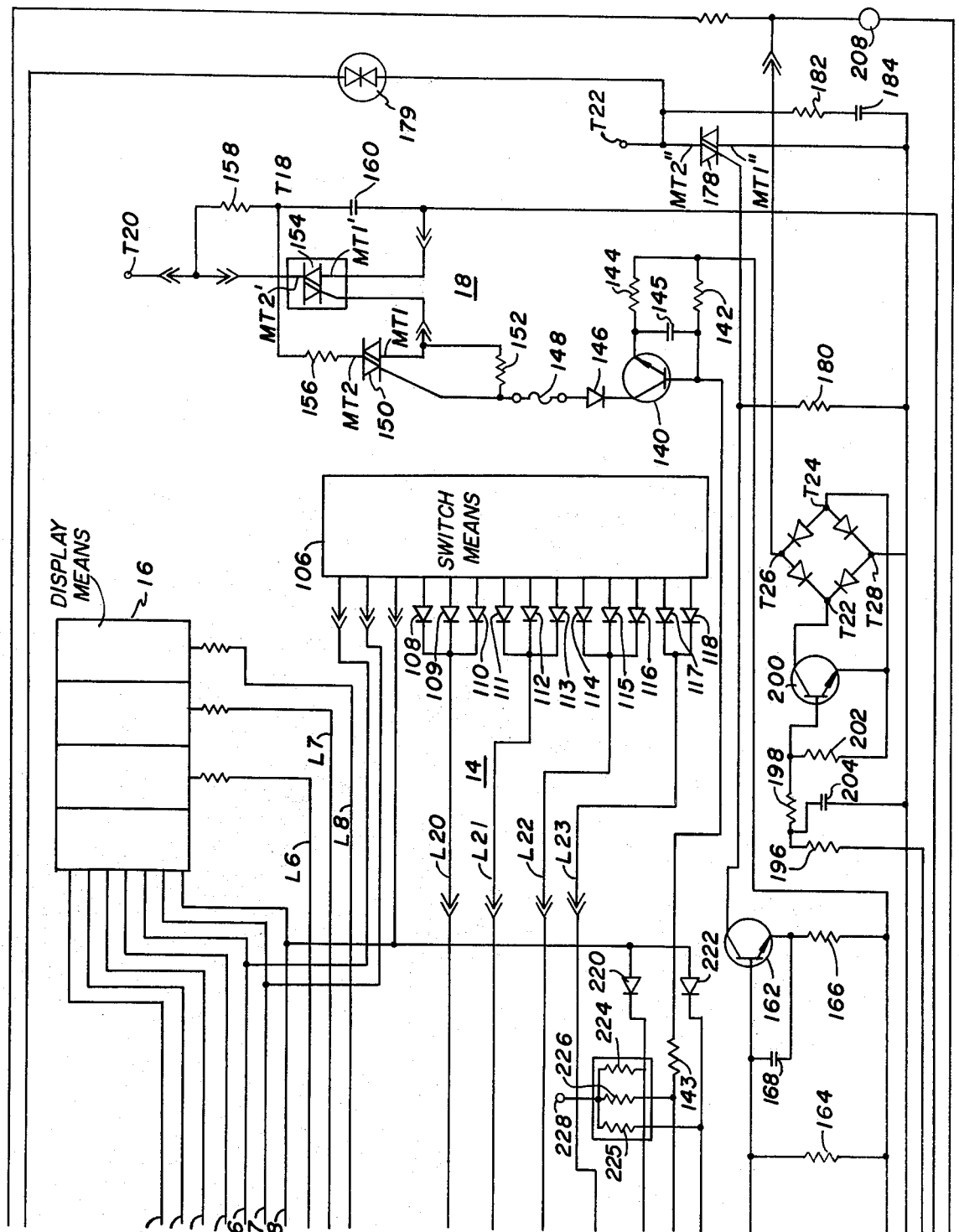

FIGS. 1A and 1B combine to show a schematic diagram of a control system constructed according to one embodiment of the present invention. In general, the control system shown in FIGS. 1A and 1B includes a power supply section 10, a microcomputer control element 12, control parameter input section 14, display means 16, power interface means 18 and power variation means 20.

More specifically, alternating current power is inputted to the control system 10 via the input terminals T10 and T12. This power is connected across the power supply section 11 for rectification and conversion into the various voltage levels required by the control system 10. The input power is connected through a voltage dropping resistor 22 to the rectifying and filtering circuit comprising diode 24, resistor 26, and capacitors 28, 30 and 32. The rectified and filtered DC voltage as produced thereby and appearing across capacitor 30 is connected across the series combination of zener diode 36, diodes 37, 38 and 39 and the parallel combination of resistor 40 and the emitter-base junction of transistor 42. The combination of the zener diode 36 having a constant reversed bias voltage of 12 volts, the forward bias voltage drop of diodes 37 through 39 of 0.7 volts each, or 2.1 volts total, and the normally constant emitter-base forward bias voltage of 0.7 volts for transistor 42, amount to a total of approximately 14.8 or 15 volts which in turn is connected across pins P14 and P18 of the microcomputer control element 12.

The resistor 43 and capacitor 44 are also connected in series from pin P14 to pin P18, respectively, with the common connection point therebetween connected to the collector 42c of transistor 42 and pin P24 of the control element 12. Pin P24 serves as the power-on reset pin. When the circuit is first energized, the voltage across the diodes 36 through 39 slowly builds and thus, the voltage across capacitor 44 also slowly builds. At the point where the resistor 40 develops a voltage thereacross sufficient to turn on transistor 42, that transistor 42 short circuits the capacitor 44 and causes the voltage thereacross to drop to zero volts as far as the control element 12 is concerned. This sudden drop is seen by pin P24 and causes the control element 12 to reset itself to the first instruction of its control program.

A diode 45 and resistors 46 and 47 are connected in series with each other and between the reduced voltage side of voltage dropping resistor 22 and pin P14 of control element 12. The junction of resistors 46 and 47 is connected to pin P25 of control element 12 and thereby provides the element 12 with a half-wave rectified signal containing the line frequency of the supply power. Pin P25 is the interrupt pin of the control element 12 and is used for monitoring the line frequency of the power supply by allowing the element 12 to count the number of cycles presented at pin P25. The control element 12 can then use the counted cycles for timing purposes. A capacitor 48 is connected between pin P25 and the supply voltage pin P14 simply as a means of transient protection and does not filter the half-wave rectified AC signal into a DC signal. A resistor 50 is connected between pin P18 and pin P17 of the control element 12. Pin P17 is a clock input pin and the connection of the resistor 50 causes an oscillator located within the control element 12 to oscillate at 80 KHz. A capacitor 52 is connected between pin P17 and pin P14 the supply voltage for the purpose of noise filtering.

A zener diode 56 has its cathode connected to pin P18 of control element 12 and its anode connected to terminal T14. T14 represents a voltage ground or voltage reference with respect to which the voltages present in the circuit may be measured. The reverse voltage drop of 8.2 volts across diode 56 combines with the 15 or so volts between pins P14 and P18 to create approximately a 23 volt power supply which is used for powering the vacuum fluorescent display 16. A capacitor 58 is connected across the diode 56 for transient protection.

A choke coil 53 and a capacitor 54 are connected to the input power line of terminal T10 for the purpose of filtering the power supply line.

A series circuit comprising a resistor 60, a diode 62 and a capacitor 62 are connected across the power supply voltage. The resistor 60 acts as a voltage dropping resistor. The diode 62 acts as a half-wave rectifier and the capacitor 64 filters the half-wave rectifed voltage into a DC voltage. A zener diode 66 is connected across the capacitor 64 and in its reverse biased condition maintains a constant voltage drop thereacross of 5.1 volts. Thus, the voltage present at terminal T16 with respect to thermal T14 is a negative 5.1 volts (hereinafter negative 5 volts).

A resistor 68 is connected in series with a heating filament 70 for the display means 16 and that series circuit is in turn connected across supply power input. A variable resistor, or varistor 72 is connected in parallel across the series combination of resistor 68 and filament 70. Varistor 72 simply shunts voltage overloads around the filament 70. Such voltage overloads are common in power lines and may be caused by any variety of occurrences elsewhere in the power line. For this embodiment, the varistor 72 is intended to shunt voltages over 150 volts. Any suitable varistor can be used, such as model number V150HE150 produced by General Electric.

The central control element 12 comprises a microcomputer supplied by Rockwell International and designated PPS-4/1 MM75. The operation of the instruction program contained therein is described in greater detail below. The control parameter input section 14, comprising pushbutton switches 81 to 90, is connected to control element 12 as points P20, P21, P22 and P23. The pushbutton switches 81 through 90 act as means for inputting various selections of control parameters into the control element 12. The pushbutton switches 81 through 90 are normally open, momentary contact switches which connect the horizontal lines L20 through L23 to the vertical lines L2, L3 and L4 when operated. The pushbutton switches 81, 85 and 89 are intended to connect line L20 to lines L2, L3 and L4, respectively. The pushbutton switches 82, 86 and 90 are intended to connect the line L21 to the lines L2, L3 and L4, respectively. The pushbutton switches 83 and 87 are intended to connect the line L22 with the lines L2 and L3, respectively. The pushbutton switches 84 and 88 are intended to connect the line L23 with the lines L2 and L3, respectively. Each of the lines L2, L3 and L4 contains an isolation diode 91, 92 and 93, respectively. The lines L2, L3 and L4 are in turn connected to the control element 12. Also connected to the lines L20 through L23 are individual biasing resistors 94 through 97, respectively, which resistors all share a common terminal 98 connected to the negative 5 volt supply of terminal T16. A plurality of capacitors 99 through 102 serves as protection against transient voltages and each has one end thereof connected to the lines L20 through L23, respectively. The capacitors all share a common terminal 103 which is connected to the positive supply voltage at pin P14.

Also connected to the lines L20 through L23 is a switch means 106 which is intended for use in determining the length of a variable period for the cycle of operation of the machine function. One embodiment of the switch means 106 is a dual-wafer rotary switch, with one wafer being a 60 position switch corresponding to 0 through 59 seconds and the other wafer being a 10 position switch corresponding to 0 through 9 minutes. The switch means 106 connects to lines L6, L7 and L8 through isolation diodes 108 through 118 to lines L20 to L23 in a manner which causes the switch means setting (minutes and seconds) to appear on line L20-L23 in binary coded form. When control element 12 sends out logic pulses on line L26, the connections within switch means 106 cause the pulses to simultaneously appear on lines L20 to L23 with each line representing a different binary digit. For pulses sent on line L26; the units of seconds or least significant digit appears on lines L20 to L23. For pulses sent on line L27, the minutes or most significant digit appears on lines L20 to L23. For pulses sent on line L28, the tens of seconds or next most significant digit appears on lines L20 to L23. By time correlating the pulses sent on lines L26 to L28 with the pulses received on lines L20 to L23 the control element 12 is thereby able to "read" the switch setting of switch means 106. Any suitable switch capable of performing this switching function may be used. One possible switch for this application is manufactured by Standard Grigsby and is designated A1068P/REL-60-2.

The output lines L2, L3, L4, L26, L27 and L28 along with output line L5 are also connected to a visual display device 16. The display device 16 is a three digit vacuum fluorescent type display manufactured by Futaba Corporation and identified as 4LT31A. The three display cells of the device 16 are individually connected to the output lines L6 through L8 of the control element 12. The seven lines L2 to L5 and L26 to L28 are each connected to the three cells and correspond to the seven segments necessary to form any numeric figure. The particular cell which is enabled by the lines L6 to L8 is illuminated according to the information present on lines L2 to L5 and L26 to L28 at the time at which the cell is so enabled. In operation, the display information is repeatedly and constantly delivered to the display device 16 in such rapid repetition that the display appears to be constantly illuminated. Ten resistors 119 through 128 are each connected to a different one of the lines L2 to L8 and L26 to L28 and have their other ends connected through a terminal 13 to the negative 5 volt supply of T16 in order to prevent any stray signals from reaching the display device 116 and thereby creating an erroneous display.

The negative 5 volt supply from terminal T16 is also connected to an output drive transistor 140 through resistors 142 and 144 with resistor 142 connected to the base of transistor 140 and the resistor 144 connected to the emitter of transistor 140. A capacitor 145 is connected between the emitter and base of transistor 140. Pin P10 is connected to the base of transistor 140 through a resistor 143. The collector of transistor 140 is connected through a diode 146 and a fuse 148 to the gate of a triac 150 for the purpose of controlling the flow of current therethrough. A resistor 152 is connected between the gate of the triac 150 and a first main terminal MT1 thereof. The terminal MT1 is connected to the gate of another triac 154. The terminal MT1' of triac 154 is connected to the input power terminal T10. Two resistors 156 and 158 and a capacitor 160 are connected to a common terminal T18. The other end of the resistor 156 is connected to the MT2 terminal of triac 150, the other end of the resistor 158 is connected to the MT2' of triac 154 and to output terminal T20. The other end of the capacitor 160 is connected to the MT1' terminal of triac 154. When a machine function is connected to terminal T20 it may be controlled by signals from the control element 12 as sent on pin P10. In one embodiment, the terminal T20 is connected to the activating power of a magnetron tube for a microwave oven.

The negative 5 volt supply voltage available at terminal T16 is also connected to an output drive transistor 162 through resistors 164 and 166. Resistor 164 is connected to the base transistor 162 and the resistor 166 is connected to the emitter of transistor 162. A capacitor 168 is connected between the base and emitter terminals of transistor 162. The base of transistor 162 is also connected through a resistor 170 to pin P13 to control element 12. A diode 172 having its anode connected to pin P13, has its cathode connected to pin P14 for the purpose of transient voltage protection. Two capacitors 174 and 176 connect pins P15 and P13, respectively, to pin P18 of control element 12, also for transient voltage projection. The collector of transistor 162 is connected to the gate terminal of a semiconductor power control device or triac 178. One main terminal MT1" of triac 178 is connected to the voltage reference terminal T14. The main terminal MT2" of triac 178 is connected to an output terminal T22 and through a varistor 179 to input terminal T12. A resistor 180 is located between the gate terminal of triac 178 and the reference terminal T14. A resistor 182 and a capacitor 184 are connected in series between the MT2''' terminal of triac 178 and the voltage reference terminal T14. The output circuit including transistor 162 and triac 178 may be used to control a second machine function. In the embodiment of the magnetron tube described above, the terminal T22 energizes a relay (not shown), the contacts for which are in series with terminal T20 and thus serve an on-off function for the energizing voltage of the magnetron tube. With this arrangement the terminal T20 is used to control the duty cycle of the magnetron tube and terminal T22 serves a simple on-off function.

The power variation means 20 is connected to pin P1 of the control element 12. The power variation means 20 nominally consists of a constantly operating multivibrator, the frequency of which may be varied by adjusting the potentiometer 190 attached thereto. The number of pulses emitted by the timer means 20 is read by the control element 12 and is used to set the duty cycle of the machine function, in this case the magnetron tube. Any suitable circuitry may be used for constructing the power variation means 20. One suitable circuit is a multivibrator contained in an integrated circuit available from several manufacturers such as Signetics, Motorola and Texas Instruments and bears the designation number 555. The proper external components and power connections for this integrated circuit may be easily determined according to common engineering standards.

An automatic turn-off feature is incorporated into the control element 12. Whenever a cooking cycle is completed or the control circuit is energized, but none of the buttons 81 through 90 is pressed to select a cooking time or a variable power mode, a signal is generated after 60 seconds on pin P11 of the control element 12. A transistor 192 is connected to pin P11 by its emitter and has its base connected through a resistor 194 to the voltage reference of terminal T14. The collector of transistor 192 is connected through the series combination of resistors 196 and 198 to the base of another transistor 200. A resistor 202 is connected between the base and emitter terminals of transistor 200 and a capacitor 204 is connected between the junction of resistors 196 and 198 and the voltage reference of terminal T14. The emitter-collector junction of transistor 200 is connected across the DC terminals T22 and T24 of a full wave bridge rectifier 206. The AC terminals T26 and T28 of the full wave bridge rectifier 206 are connected across the energizing coil of the relay 208 used to activate the control circuit 10. In this case, T28 and the contol relay coil are connected to the voltage reference of terminal T14. The relay coil of relay 208 is otherwise connected through a resistor 210 to power input terminal T12 on one side, and on the other side to a pair of its own contacts 212 and a contact 214 of a door switch 216. The other side of contacts 212 and the common terminal of switch 216 are both connected to the power input terminal T10. The terminal 214 of door switch 216 corresponds to the open condition of a microwave oven door. Another door switch 218 is located between the power terminal T12 and the power supply section 11. The switch 218 is closed when the oven door is closed. The operation of these various switches and components is described below.

The circuit also includes provisions for allowing the use of 50 Hz power by means of inclusion of a diode 220 having its anode connected to line L8 and its cathode connected to pin P9 of the control element 12. Provision is also made to allow testing of the operation of the circuit by insertion of a diode 222 with the cathode thereof connected to pin P15 of control element 12 and the anode connected to line L28. When the diode 222 is connected as described, the program located within the control element 12 is operated at 60 times its normal speed in order to allow review of the entire operation within a short time period. Resistors 224, 225 and 226 are connected to the cathodes of diodes 220 and 222 and to pin P10 of control element 12, respectively, and have the other ends thereof connected in common at 228 to the negative 5 volt supply at terminal T16 for preventing any transient pulses from reaching the control element 12 at pins P9, P15 and P10, respectively.

The control system 10 is also equipped with an alarm circuit 230 containing a piezoelectric oscillator 232, a transistor 234 and three resistors 236, 238 and 240. The resistor 236 is connected from pin P12 of control element 12 to the feedback terminal 242 of oscillator 232. Resistor 238 is connected between the feedback terminal 242 and the base of transistor 234. The resistor 240 connects the emitter of transistor 234 to the negative 5 volt supply of T16. The terminal 244 of the oscillator 232 is connected to the emitter of transistor 234. The collector of transistor 234 and the voltage supply terminal 246 of oscillator 232 are connected to the positive voltage of pin P14. In operation, when the control system 10 is energized, the oscillator crystal is maintained in a non-oscillating but deflected position, with the transistor 234 nonconducting. When a positive voltage logic signal is presented and maintained at pin P13, the transistor 234 starts to conduct thus reducing the voltage between terminals 244 and 246 to less than one volt. This allows the oscillator crystal to return to its undeflected state which movement generates a feedback voltage on terminal 242. The feedback voltage causes the transistor 234 to shut off and thus resume the higher voltage potential across terminals 244 and 246. Transistor 234 is repeatedly turned on and off in this manner causing the oscillator to generate the alarm sound. Any suitable alarm device which is responsive to logic voltage levels may be used. The system 10 uses a SONAL-ERT device manufactured by Mallory Capacitor Company and designated 22-07607.

Figure 2A:
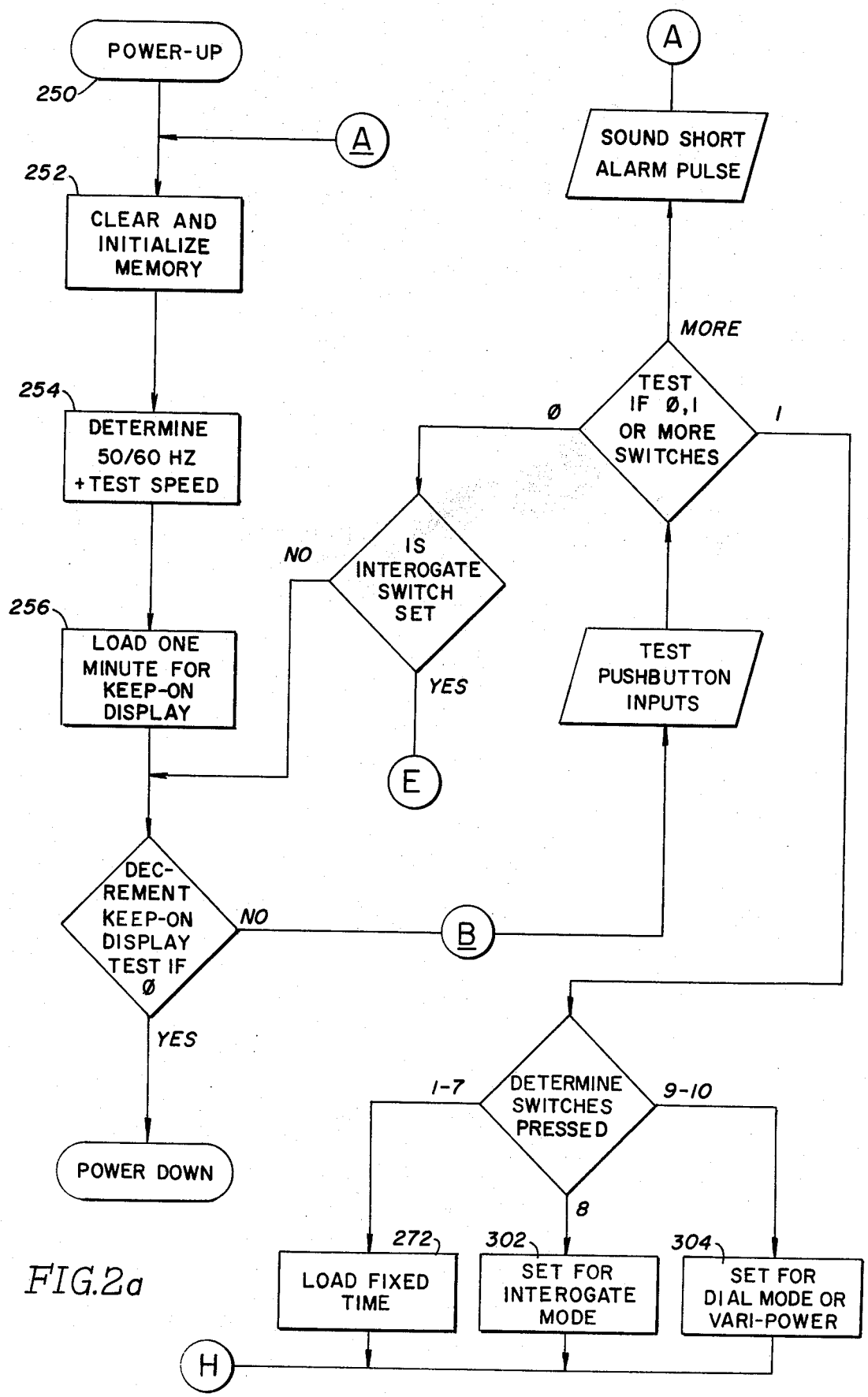
FIGS. 2a, 2b and 2c, is a flow chart illustrating the instruction program used by the embodiment of FIG. 1.
Figure 2B:
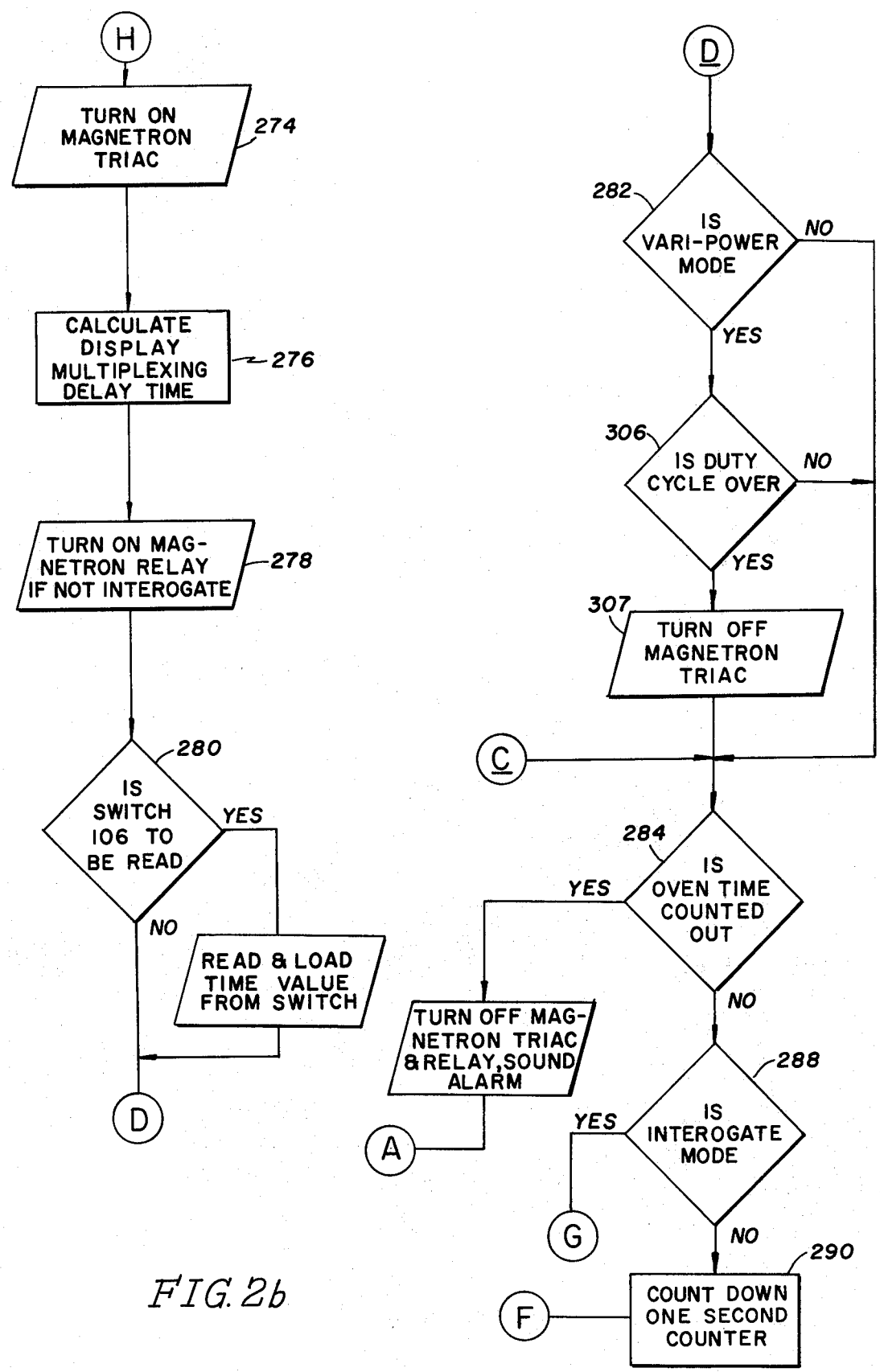
Figure 2C:
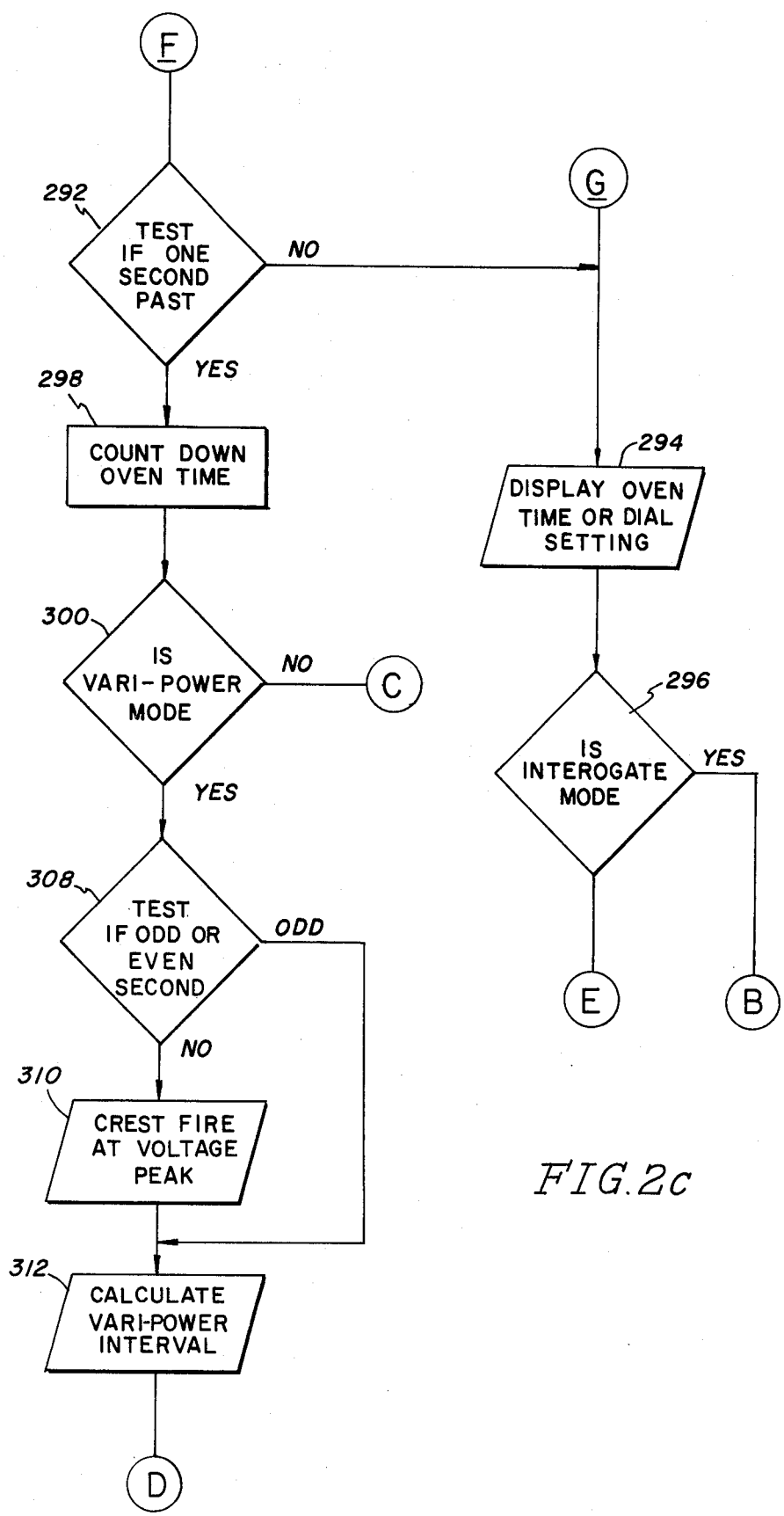

As previously mentioned, the microcomputer control element 12 contains an instruction program by which it operates the control system 10. The instruction program is illustrated in FIGS. 2a, 2b and 2c, and will now be described in reference to the operation of the control system 10 as shown in FIGS. 1a and 1b. When an operator uses the microwave oven for which the present embodiment is designed, he first opens the oven door (not shown) causing the door switch 216 to make contact with the door open contact 214 thereof. This applies input power across the coil of relay 208 and causes the contacts 212 thereof to close and maintain energization of relay 208. After the operator places food in the oven and closes the door, the contacts of another door switch 218 are closed causing power to be connected to the control system 10 through the contacts 212 of energized relay 208. As previously discussed, the voltage across capacitor 44 slowly builds until transistor 42 is made conductive. At this point, the capacitor 44 is short circuited and the voltage applied to pin P24 drops to zero. This signals the control element 12 to begin the instruction program contained therein as indicated by the power-up block 250. The program automatically continues with the Clear and Initialize Memory block 252 in which various portions of the memory contained with the control element 12 are cleared and set with the initial necessary contents. The program then proceeds to block 254 to determine whether the diodes 210 and 212 is connected as shown, indicating that the system is being operated on 50 Hz power and that the system is simply being tested and thus should be operated at 60 times its normal speed, respectively. In instruction block 256, the program loads a counter located in the random access memory of the microcomputer control element 12 for allowing a one minute count down afer energization of the control system 10. In the next instruction block 258, the program counts down the number loaded in block 256 and determines whether that number has been counted out, that is whether the number equals zero. If it has been counted out, this indicates that a full minute has elapsed since the energization of the control system 10 without a cook cycle being selected and the program proceeds to instruction block 260 causing deenergization of the system 10. Deenergization is accomplished by transmitting a signal on pin P11 which causes the full wave bridge rectifier 206 to short the terminals of the coil of relay 208 thus opening the contacts 212 and deenergizing the system.

If the number loaded in block 256 is not counted out, the program proceeds to instruction block 262 in which it tests to see whether any of the input pushbuttons 81 through 90 is being pushed. To perform this operation, logic pulses are transmitted by control element 12 on lines L2, L3 and L4 and the results on lines L20-L23 are monitored to determine whether any pushbuttons are being pressed. The results of this test are shown in block 264. If no pushbuttons have been activated, the program proceeds to block 266 wherein it determines whether the interrogate switch, pushbutton 88, has been pressed. As none of the pushbuttons have been pressed, the program proceeds back to block 258 to proceed in decrementing the one minute timer and determining whether the one minute has elapsed since energization. The program will circulate through the loop including blocks 258, 262, 264 and 266 until either one minute elapses after energization or at least one of the pushbuttons 81 through 90 is pressed.

In the event that two or more of the pushbuttons 81 through 90 are simultaneously depressed, the program proceeds to block 268 wherein the alarm device circuit 230 is energized indicating improper activation of pushbuttons. After this, the program returns to the Clear and Initialize Memory block 252 to allow reinitiation of the program.

In the event that the instruction block 264 determines that one of the pushbuttons 81 through 90 has been pushed, the program will proceed to instruction block 270 which determines which pushbutton has been pushed. The pushbuttons 81 through 87 each corresponds to a different fixed period of time for operating the magnetron. Pushbutton 81 corresponds to 10 seconds. Pushbutton 82 corresponds to 20 seconds. Pushbutton 83 corresponds to 30 seconds. Pushbutton 84 corresponds to 45 seconds. Pushbutton 85 corresponds to one minute. Pushbutton 86 corresponds to one minute and 15 seconds, and pushbutton 87 corresponds to one minute and 30 seconds. All of the above fixed time periods are recorded in memory so that pressing any of the buttons 81 through 87 will automatically engage the machine function of the magnetron tube at full power output for the fixed period. The control element 12 distinguishes between pushbuttons 81 through 90 by referring to the time relationship between pulses sent out on lines L2, L3 and L4 and the corresponding pulses received on lines L20 through L23. Thus, if one of the pushbuttons 81 through 87 has been pressed when the program reaches block 270, the program will proceed to block 272 and load the time corresponding to the selected period into a portion of the random access memory to allow the down counting thereof. Then the program proceeds to instruction block 274, where it turns on the magnetron triac by energizing pin P10. In the following instruction block 276, the program calculates the display multiplexing delay time. This step is solely concerned with the output appearing on the display means 16 and is necessary only for purposes of the brightness of that display. In the next instruction block 278, the instruction program activates the magnetron relay through the triac 178. As mentioned, the magnetron relay has contacts connected in series with the output terminal T20 to serve as a straight on-off function, where the output T20 may be used for duty cycle control.

The program then proceeds to the instruction block 280 wherein it determines whether the switch 106 is to be read or not. In this case, as the program is operating on its fixed time period, the answer is no and the program proceeds to instruction block 282. Block 282 asks the question whether the variable power mode is selected. In this case, it is not and the computer program proceeds to instruction block 284 wherein the program asks whether the oven time, as loaded in instruction block 272, has been counted down. If it has, the program would proceed to instruction block 286 and turn off both the magnetron via triac 154 and the magnetron relay via triac 178. In addition, the alarm circuit 230 is activated for six one half second pulses to indicate the end of the cooking cycle. The program then proceeds to step through blocks 252, 254, 256, 258, 262, 264 and 266 for one minute after passing instruction block 256 again and then causes the system to power down by going to block 260 from block 258. In this manner, the control system maintains activation of the control circuit for one minute after the cooking cycle is completed and then shuts itself off.

Returning to instruction block 284, if the oven time is not counted out, the program proceeds to instruction block 288 wherein it asks whether the interrogate switch, pushbutton 88, is set. As this operation is based on a fixed period, the answer is no and the program proceeds to instruction block 290, where it decrements a one second counter. After this, the program proceeds to instruction block 292, where it asks whether the one second counter has been completely decremented and one second is passed. If not, the program proceeds to instruction block 294 where it displays the oven time remaining. In the next logic block 296, the program again asks whether the interrogate switch, pushbutton 88, is set. As it has not been, the program returns to point E, or instruction block 280, where it asks whether the switch 106 is to be read. As the answer is no, the program proceeds to instruction block 282 again asking whether the variable power function is engaged, and after that to instruction block 284, where it asks whether the oven time has been counted out.

In the next step, the program proceeds again to instruction block 288, 290 and 292 in sequence. After the program has run through this loop, including blocks 292, 294, 296, 280, 282, 284, 288 and 290, for a period of one second, the one second counter will have been fully decremented and the answer to question block 292 will be yes, wherein the program will proceed to instruction block 298. At block 298, the program will count down the oven time by one second. This oven time is that which was loaded in instruction block 292. Next, the program will proceed to instruction block 300, where it will ask whether a variable power mode is in progress. As the answer is no, the program will proceed to point C or instruction block 284. From there the program will cycle through instruction blocks 284, 288, 290, 292, 294, 296, 280, 284 and so on until another one second interval is counted down by instruction block 290, whereupon the program again will proceed to instruction blocks 298, 300 and back to 284. This routine will continue until the oven time, in seconds, is completely counted out, at which time the instruction block 284 will send the program to instruction block 286 causing it to turn off the oven.

Returning to instruction block 270, if pushbutton 88 was pressed, the program will proceed to instruction block 302 where it will record a reminder that the interrogate switch was pressed. Thereafter, the program will proceed through instruction blocks 274, 276, 278 and at instruction block 280, the program will ask whether the switch means 106 is to be read. After the operator has depressed pushbutton 88, he would normally select a cooking time and then depress either pushbutton switch 89 for the variable power mode or switch 90 for the full-power mode. If neither of the pushbutton switches 81 to 87, 89 and 90 is pressed, the answer to instruction block 280 will be no and the program will proceed to instruction block 282 again asking whether the variable power mode has been selected. As pushbutton 89 has not been depressed, the program will proceed to instruction block 284, the answer to which is no. This will cause the program to proceed to instruction block 288, wherein the answer is yes, and the program will proceed to instruction block 294. At block 294, the program will display whatever time is set on the switch means 106 even though neither pushbutton 89 nor 90 has been pressed. The program will then proceed to instruction block 296, the answer to which will be yes causing the program to return to point B, or instruction block 262; wherein it will again test the pushbutton inputs to determine if any of the switches 81 to 87, 89 and 90 are being pressed. If not, the program will continue to loop through instruction blocks 264, 266, 280, 282, 284, 288, 294, 296 and back to instruction block 262 until one of the pushbutton switches has been pressed. Please note that if any of the pushbuttons 81 to 87 is pressed, the program will proceed from block 262 to block 270 as described above even though the interrogate switch, pushbutton 88, has been pressed.

Assuming that the full-power mode is selected by the pressing of pushbutton switch 90, the program will proceed to instruction block 270 and then to instruction block 304, wherein the program will record that the variable time, full-power mode has been selected. After this, the program will proceed through instruction blocks 274, 276, 278 and 280. At instruction block 280, because a time selection has been set by the pressing of button 10, the program will proceed to instruction block 305 where it will read the time set on switch means 106 and store that time in memory. Next, the program will proceed to instruction block 282, the answer to which is still no, and then to instruction block 284. Here, the program will loop through instruction blocks 284, 288, 290, 292, 298, 300, including a sub-loop through instruction blocks 294, 296, 280 and 282. When the cooking cycle is complete, the program will deactivate the control system 10 in the same manner as during the fixed period cooking cycle.

Returning now to instruction block 262 and assuming that the variable power mode of operation has been selected, in that pushbutton 89 has been pressed, the program will proceed to instruction blocks 264, 270 and 304. At instruction block 304 the program will record the fact that a variable time, variable power mode has been selected and then proceed through instruction blocks 274, 276, 278, 280 and 305 to instruction block 282. In this instance, the answer to instruction block 282 is yes, so the program will proceed to instruction block 306. The question whether the end of the variable power interval has been reached refers to the "on" portion of the duty cycle, which is varied to achieve the variable power function. On the initial run through this block, the answer will be no, so the program will proceed through instruction blocks 284, 288, 290 and 292. The one second timer will again be used causing the program to circulate through instruction blocks 294, 296, 280, 305, 282, 284, 288, 290 and 292, until the one second interval is passed, at which time the program will proceed to instruction blocks 298 and 300. As the variable power mode has been selected, the program will proceed to instruction block 308 to determine whether it is an odd or even second. The total cycle of the magnetron in the variable power mode is two seconds long with the even second used for starting the duty portion of the cycle. In the present case, the program will proceed to instruction block 310 where it will engage a crest firing circuit (not shown) to fire the magnetron at the voltage peak of the alternating current power wave form. After block 310 the program will proceed to block 312 which includes instruction for calculating the variable power duty cycle. This is done in reference to the output of the multivibrator of power variation means 20. The result is an output signal from pin P10 which is a square wave having the pulse width thereof dependent upon the selected power level. This signal is used to operate the magnetron tube through triac 154 and terminal T20.

The program next returns to point D in the flow chart and proceeds to blocks 282 and 306. As long as the duty cycle output signal is in the "on" portion, the answer to this question is no and the program will cycle through blocks 284, 288, 290, 292, 298, 300, 308, 312, 282 and 306 with a sub-loop through 294, 296, 280, 282, 306, 284, 288, 290 and 292. When the "on" portion of the duty cycle ends and the program reaches instruction block 306 the answer becomes no and the magnetron is deactivated by the signal at pin P10 by the program in instruction block 307. From this point, the program loops through blocks 284, 288, 290, 292, 298, 300, 308, 312, 282 and 306 with a sub-loop through blocks 294, 296, 280, 282, 306, 284, 288, 290 and 292 until the next "even" second is reached at instruction block 308 wherein the program will proceed to block 310 and begin another "on" portion of the duty cycle.

The above described loops will continue until the answer to instruction block 284 becomes "yes" wherein the program proceeds to block 286 and deactivates the circuit. It should be noted that in both of the loops described immediately above the program continually passes through block 312 where it calculates the duty cycle. Each time this is done, reference is made to the multivibrator of the power variation means 20. In this manner, the system allows the amount of power being applied to the machine function to be varied at any point in time, even during an actual operating period of the machine function.

Thus, the instruction program described above and contained within the control element 12 enables the machine function to be controlled either in response to one of a multiplicity of easily selectable fixed time periods or in response to an individually determined variable period and at full or variable power levels. Different variables within the program may be easily changed. Thus, the system 10 may be easily adapted for controlling machine functions of a nature different from that of the system described above, as the control is all contained within the program and the control element 12 can simply be programmed according to the needs of each different machine function.

The above description is intended to be illustrative of one embodiment of the present invention and not to be taken in a limiting sense. Various modifications and changes may be made to the above system by someone skilled in the art without departing from the scope of the appended claims.

What is claimed is:

1. A control system for an apparatus having at least one machine function and a cycle of operation associated therewith, comprising:
   a central control element for controlling said machine function,
   first means for inputting a selection of one of a plurality of fixed periods to said central control element for causing said control element to activate said machine function for said cycle of operation in response to said one period;
   manually operable switch means for determining a variable period for said cycle of operation independently of said central control element; and
   second means for inputting said variable period from said means for determining and into said central control element,
   said central control element having information stored therein, said information including said plurality of fixed periods for selection through said first means for inputting and an instruction repertoire for causing said control element to control said machine function in response to either one of said fixed periods or said variable period.

2. The control system of claim 1, further comprising third means for inputting a selection for causing said control element to control said machine function in response to the variable period determined by said means for determining.

3. The control system of claim 2, wherein said instruction repertoire includes first instruction means for causing said control element to be responsive to said third means for inputting.

4. The control system of claim 3, further comprising fourth means for inputting an indication that a variable period has been determined by said means for determining.

5. The control system of claim 4, wherein said instruction repertoire includes second instruction means for causing said control element to be responsive to said fourth means for inputting and said second means for inputting and to control said machine function in response to the period determined by said means for determining.

6. The control system of claim 1, further comprising means for enabling said central control element to control said machine function by controlling the operating power applied to said apparatus.

7. The control system of claim 6, further comprising means for enabling said control element to vary the amount of operating power applied to said apparatus.

8. The control system of claim 7, wherein said instruction repertoire includes third instruction means for enabling said control element to vary the amount of power applied to said apparatus during the operation of said machine function.

9. The control system of claim 1, wherein said control element is a computer and said instruction repertoire is a computer program.

10. The control system of claim 9, wherein said computer is a microcomputer having at least a plurality of output terminals and at least a multiplicity of input terminals, further wherein first said means for inputting includes a multiplicity of momentarily operable switches coupled between said microcomputer output terminals and said microcomputer input terminals, and still further wherein said manually operable switch means includes rotary switch means coupled between said microcomputer output lines and said microcomputer input lines for coding an operator selection for a variable period as a binary coded decimal for input to said microcomputer.

11. A control system for an apparatus having at least one machine function and a cycle of operation associated therewith, comprising:
a central control element including means for storing information for controlling said machine function, said information including an instruction repertoire and a plurality of selectable fixed periods for said cycle of operation;
first means for inputting a selection of one of said plurality of periods to said central control element for causing said control element to activate said machine function for said cycle of operation in response to said one period;
manually operable switch means for determining a variable period for said cycle of operation independently of said central control element; and
second means for inputting said variable period from said means for determining and into said central control element whereby said apparatus may be activated by said central control element for a cycle of operation in response to either one of said plurality of fixed periods or an independently variable period.

12. The control system of claim 11, further comprising means for enabling said central control element to control said machine function by controlling the operating power applied to said apparatus.

13. The control system of claim 11, further comprising means for enabling said central control element to vary the amount of operating power applied to said apparatus.

14. The control system of claim 11, wherein said manually operable switch means includes rotary switch means coupled to said central control element for coding an operator selection for a variable period as a binary coded decimal for input to said central control element.

15. The control system of claim 11, further comprising display means operable during said cycle of operation for displaying the amount of the period remaining for said cycle of operation.

16. The control system of claim 11, wherein said central control element includes a microcomputer having at least a plurality of output terminals and at least a multiplicity of input terminals, further wherein first said means for inputting includes a multiplicity of momentarily operable switches coupled between said microcomputer output terminals and said microcomputer input terminals, and still further wherein said rotary switch means is also coupled between said microcomputer output terminals and said microcomputer input terminals.

17. A method for controlling an apparatus by a control system including a control element having information stored therein, said information including an instruction repertoire for causing said control element to operate said apparatus either in response to one of a plurality of fixed periods also stored as said information or a variable period determined independently from said control element by a manually operable switch means, said method comprising: determining whether one of said plurality of fixed periods or said variable period has been selected for the operation of said apparatus; recording the period selected either from said stored information if one of said plurality of fixed periods or from said manually operable switch means; and operating said apparatus for said recorded period.

18. The method of claim 17, further comprising causing said control system to be deactivated in the event that a selection of a period for operation of said apparatus is not made within a predetermined amount of time.

19. The method of claim 17, wherein said determining includes recording an indication that said period to be recorded for said operating of said apparatus is to be recorded from said manually operable switch means, and further wherein said recording of said period from said manually operable switch means is caused by signalling said control element that said period to be recorded has been determined by said manually operable switch means.

20. The method of claim 17, further comprising recording a signal for making variable the amount of power with which said control element operates said apparatus.

21. The method of claim 20, further comprising deriving a level for the amount of power with which said control element operates said apparatus in response to means for inputting a variable power selection.

* * * * *